United States Patent

Josten et al.

[11] Patent Number: 6,054,534
[45] Date of Patent: Apr. 25, 2000

[54] SILICONE POLY(METH) ACRYLATES, THEIR PREPARATION AND THEIR USE IN COATINGS

[75] Inventors: Wolfgang Josten, Essen; Gerhard Reusmann, Münster; Stefan Silber, Krefeld, all of Germany

[73] Assignee: R Th. Goldschmidt AG, Essen, Germany

[21] Appl. No.: 08/944,847

[22] Filed: Oct. 6, 1997

[30] Foreign Application Priority Data

Oct. 11, 1996 [DE] Germany ............... 196 42 269

[51] Int. Cl.[7] .................................................. C08F 8/00
[52] U.S. Cl. ................. 525/100; 525/329.7; 525/330.3; 525/342
[58] Field of Search ..................... 525/100, 342, 525/329.7, 330.3

[56] References Cited

U.S. PATENT DOCUMENTS

| 4,929,666 | 5/1990 | Schmidt et al. . |
| 5,006,624 | 4/1991 | Schmidt et al. . |

FOREIGN PATENT DOCUMENTS

| 0117311 | 9/1984 | European Pat. Off. . |
| 0205827 | 12/1986 | European Pat. Off. . |
| 0368320 | 5/1990 | European Pat. Off. . |
| 0603561 | 6/1994 | European Pat. Off. . |
| 3535283 | 4/1987 | Germany . |
| 4414465 | 5/1995 | Germany . |

*Primary Examiner*—Bernard Lipman
*Attorney, Agent, or Firm*—Frommer Lawrence & Haug

[57] ABSTRACT

The present invention relates to silicone poly(meth) acrylates, to a process for their preparation from alkoxysiloxanes and hydroxy-functional poly(meth)acrylates and to their use as an additive in coatings, especially as an anti-graffiti additive.

19 Claims, No Drawings

SILICONE POLY(METH) ACRYLATES, THEIR PREPARATION AND THEIR USE IN COATINGS

The present invention relates to silicone poly(meth) acrylates, to a process for their preparation from alkoxysiloxanes and hydroxy-functional poly(meth)acrylates and to their use as an additive in coatings, especially as an antigraffiti additive.

In recent years there has been a continual increase in the frequency of unwanted graffiti produced in public. In many cases it is public buildings and means of transport that are affected. Since in the majority of cases removal by simple washing off is not possible, labor- and cost-intensive recoating of the graffiti-soiled surfaces is generally necessary. Consequently, possibilities have for some time now been sought for removing unwanted graffiti in a simple and cost-effective manner.

For instance, protective coatings have been developed which comprise fluorine-containing polymers, as described for example in U.S. Pat. No. 4,929,666 and U.S. Pat. No. 5,006,624. In this case dirt-repelling properties are achieved by the reduction in surface tension of the coating. One of the disadvantages of fluorine-containing products, however, is the high price.

DE-A-35 35 283 describes polysiloxanes which contain polyester groups and are intended for coating materials and molding compounds. The polysiloxane imparts an antiadhesive property to the coating materials or molding compounds. However, a very high concentration is necessary in order to achieve an adequate effect, with the result that other properties of the coating material may be adversely affected.

The transesterification of poly(meth)acrylates with hydroxy-functional siloxanes is described in DE-A-44 14 465. This transesterification takes place selectively at the chain ends of the polymer framework and permits likewise only a limited degree of modification.

Hydroxy-functional (meth)acrylates are linked with hydroxy-functional siloxanes, according to EP-A-0 368 320, by way of at least difunctional isocyanates to form urethane linkages. Polyfunctional, hydroxy-functional (meth) acrylates tend under these conditions, however, to gel easily.

By copolymerizing α,ω-unsaturated siloxane monomers with (meth)acrylate monomers, according to EP-A-0 117 311 or EP-A-0 205 827, siloxane-modified (meth)acrylates are prepared.

EP-A-0 603 561 describes polydimethylsiloxane-containing binders which are obtained by free-radically initiated polymerization of (meth)acrylate monomers or vinylaromatic monomers in the presence of α,ω-functional polysiloxanes. In this reaction the functional groups of the polysiloxanes employed are largely retained. Since the fixing of the polysiloxanes in the binder matrix formed by the polymerization of the monomers is very largely only physical (interlooped polymer networks) there are incompatibilities with coating systems. Moreover, the systems exhibit inadequate resistance to soiling, for example to felt pens.

It is an object of the invention, therefore, to provide coating components which are suitable for dirt-repelling coatings and which retain their dirt-repelling action over a long period of time, for example several years. This includes the permanence of the dirt-repelling effect over a number of cleaning cycles as well.

It has surprisingly been found that this object can be achieved by coating compositions which comprise as the coating constituent, in concentrations of from 0.01 to 15%, preferably from 1 to 10%, the silicone poly(meth)acrylates obtained by condensation reactions from alkoxysiloxane intermediates.

One subject of the invention is, therefore, modified polysiloxanes which are suitable as an additive for coating compositions.

The compounds according to the invention can be used, for example, as additives in water-based, solvent-based or pulverulent coatings or printing inks, including use as deaerating agents, lubricants and leveling agents, etc. Typical use concentrations are between 0.01 and 15% by weight.

The compounds according to the invention correspond to the general formula

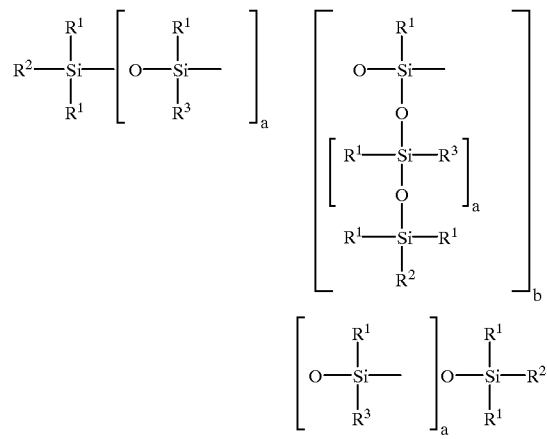

in which the radials
$R^1$ are identical or different aliphatic or aromatic hydrocarbon radicals, at least 90% of the groups $R^1$ being methyl groups,
$R^2$ are identical or different alkoxy radicals or are identical or different poly(meth)acrylate radicals, at least 20% of the groups $R^2$ being poly(meth)acrylate radicals,
$R^3$ is $R^1$ or $R^2$,
a is 1 to 100 and
b is 0 to 20.

The skilled worker is well aware that the compounds are in the form of a mixture with a distribution determined essentially by statistical laws. The values for the indices a and b are therefore mean values.

The silicone poly(meth)acrylates according to the invention are obtainable by metal-catalyzed nucleophilic substitution of, for example, customary commercial hydroxy-functional poly(meth)acrylates with organoalkoxysiloxanes.

In this case the linking of the polymer segments takes place by way of an Si—O—C bond, at least 20% of the groups $R^2$ being hydroxy-functional poly(meth)acrylate radicals. Particular preference, moreover, is given to copolymers in which not more than 70% of the groups $R^2$ are hydroxy-functional poly(meth)acrylate radicals.

For the purposes of this application hydroxy-functional poly(meth)acrylates are products of the addition polymerization of acrylates and/or methacrylates, and also corresponding products of copolymerization with other unsaturated compounds, which possess at least one reactive hydroxyl group attached to carbon.

The synthesis of these hydroxy-functional poly(meth) acrylates takes place by processes of free-radical polymerization which correspond to the prior art. Preferred hydroxy-functional acrylate monomers are hydroxyethyl acrylate, hydroxypropyl acrylate, hydroxyethyl methacrylate and hydroxypropyl methacrylate.

For the purpose of this invention the hydroxy-functional poly(meth)acrylates feature a weight-average molecular weight (Mw) of from 2000 to 30,000 and an OH content of from 1 to 10%.

Examples of hydroxy-functional poly(meth)acrylates of this kind which are customary commercially include Jagotex F 237 (from Ernst Jäger, Dusseldorf), Kacryl Al 190 (from Kapol-Chemie, Hamburg), Synthalat A 191 (from Synthopol Chemie, Buxtehude), Joncryl 500 (from SC Johnson Polymer, Mijdrecht) and Desmophen A 66S BW (from Bayer AG, Leverkusen).

The siloxanes employed for the reactions with hydroxy-functional poly(meth)acrylates can have, for example, the following structure $$R^2-\underset{R^1}{\underset{|}{\overset{R^1}{\overset{|}{Si}}}}-\left[O-\underset{R^3}{\underset{|}{\overset{R^1}{\overset{|}{Si}}}}\right]_a \left[O-\underset{\underset{\underset{R^1-\underset{R^2}{\underset{|}{\overset{|}{Si}}}-R^1}{|}}{\left[\underset{O}{\underset{|}{R^1-\underset{R^3}{\underset{|}{\overset{|}{Si}}}-R^3}}\right]_a}}{\overset{R^1}{\overset{|}{Si}}}\right]_b \left[O-\underset{R^3}{\underset{|}{\overset{R^1}{\overset{|}{Si}}}}\right]_a O-\underset{R^1}{\underset{|}{\overset{R^1}{\overset{|}{Si}}}}-R^2$$

| Compound | a = | b = | $R^1$ = | $R^2$ = | $R^3$ = |
|---|---|---|---|---|---|
| 1 | 6 | 0 | Me | OEt | Me |
| 2 | 12 | 0 | Me | OEt | Me |
| 3 | 19 | 0 | Me | OMe | Me |
| 4 | 8 | 2 | Me | OEt | Me |

By condensation of these siloxanes with hydroxy-functional poly(meth)acrylates preferably some, but at least 20%, of the groups $R^2$ are replaced by hydroxy-functional poly(meth)acrylate radicals.

The particular degree of conversion can be determined by means of $^{29}$Si NMR spectroscopy.

Examples of silicone poly(meth)acrylates according to the invention, then, are:

| Compound | a= | b= | $R^1$= | $R^2$= | $R^3$= |
|---|---|---|---|---|---|
| 5 | 6 | 0 | Me | 50% OEt, 50% $OR^4$ | Me |
| 6 | 12 | 0 | Me | 30% OEt, 70% $OR^4$ | Me |
| 7 | 19 | 0 | Me | 55% OMe, 45% $OR^4$ | Me |
| 8 | 8 | 2 | Me | 75% OEt, 25% $OR^4$ | Me |

$R^4$ in these cases is a copolymer comprising 5 parts by weight hydroxypropyl methacrylate, 20 parts by weight butyl acrylate, 4 parts by weight acrylic acid and 19 parts by weight methyl methacrylate, obtained by solution polymerization—in accordance with the prior art—in Solvesso 150 with regulation by dodecyl mercaptan. The weight-average molecular weight in this case is 8000 g/mol.

The skilled worker is well aware that the reaction of oligo- and/or polyfunctional molecules with one another leads to a mixture of substances which also includes corresponding oligomers and polymers of the co-reactants. These are likewise claimed.

Surprisingly, the use of the compounds according to the invention is particularly suitable for producing dirt-repelling coatings. They can be used, for example, to produce anti-graffiti coatings.

The compounds according to the invention can be incorporated by simple stirring into the coating compositions which are intended to exhibit a dirt-repelling effect. These coating compositions can be coating systems which are customary in the paints sector. Surprisingly, the compounds according to the invention are suitable both for solvent-based and for water-based coating systems.

The liquid phase can also be in the form of monomers for low molecular mass compounds which react with other binder components to form the coatings. The coating materials according to the invention can also be so-called powder coatings, which thus comprise no liquid phase and are applied in the form of powders to the substrates that are to be coated, where they are reacted.

The coating compositions can be prepared by adding additives as are customary in the paints sector, for example. Examples of such additives are pigments, for example hiding, color-imparting pigments, such as titanium dioxides or carbon black, and special-effect pigments, such as metal flake pigments and/or pearl luster pigments or transparent pigments.

Other examples of additives are fillers, for example talc and silicates, plasticizers, stabilizers, including light stabilizers, and leveling agents, such as silicone oils.

The desired application viscosity of the coating compositions prepared with the compounds according to the invention can be established by appropriately regulating the addition of solvents and/or water and/or additives.

The curing of coatings produced from the coating compositions is dependent on the respective nature of the crosslinking reaction and can take place within a wide temperature range of, for example, from −10° C. to 200° C.

Surprisingly, the compounds according to the invention exhibit a good antigraffiti effect even on curing at room temperature.

The coating compositions prepared from the compounds according to the invention are suitable for coatings which adhere to a large number of substrates, for example wood, plastic, glass, ceramic, textiles, plaster, cement and, in particular, metal. The coating compositions can also be employed in a multicoat process. They can be applied, for example, to customary primers, basecoats, fillers or existing topcoats.

The compounds according to the invention are especially suitable for coating compositions which are to have a dirt-repelling action. The present invention therefore also relates to the use of the compounds according to the invention in topcoats or clearcoats.

With the compounds according to the invention a high dirt-repelling action (e.g. antigraffiti effect) is obtained and is retained over long periods of time even under unfavorable weather conditions. The dirt-repelling action is retained even after repeated cleaning of the surface of the coating composition, for example by solvents, customary commercial graffiti removers or scrapers.

When the dirt-repelling coating according to the invention is soiled by graffiti, the disruptive effect on wetting means that the development of an uninterrupted graffiti paint film is impossible.

Especially in connection with clearcoats where clouding of the dried coating film causes adverse effects with respect to the optical quality of the coating as a result of incompatibility of the antigraffiti compound with the coating components, the outstanding compatibility of silicone poly (meth)acrylates according to the invention with the coating system, and the associated development of clear, transparent films, show particular advantages.

The invention is particularly surprising because of the fact that the quality of the antigraffiti effect and the ability of the antigraffiti compounds to form clear films in the coating formulation often run counter to one another. Surprisingly, when using the silicone poly(meth)acrylates according to the invention, a combination of excellent antigraffiti effect and outstanding compatibility with the coating compounds, and the consequential formation of cloudless transparent films, has been found.

The coating composition according to the invention can be applied in a customary manner, for example dipping, spraying, spreading or by an electrostatic method.

The examples which follow serve to illustrate the invention.

EXAMPLE 1

Preparing a silicone poly(meth)acrylate according to the invention 466.0 g of Joncryl 500 (80% strength in 2-heptanone, from Speciality Chemicals, Mijdrecht), 149.8 g of Solvesso 150, 84.2 g of siloxane 1 (ethoxy content 6.6%) and 2.75 g of aluminum acetylacetonate are placed in a reaction vessel with stirrer, thermometer and distillation device. The mixture is heated slowly to 155 to 160° C. and the distillate which forms is removed continuously. After about 30 minutes at 155 to 160° C. the reaction mixture is clear and homogeneous at room temperature (tested by applying a quantity of sample to a glass plate). The mixture is cooled, 4 g of Celite J 10 are added, and the mixture is filtered through a T 1000 filter (from Seitz). The resulting product is clear, yellowish and has a viscosity of about 340 mPas at 25° C. At least 65% of the ethoxy groups have reacted (conversion check by way of gas-chromatographic analysis of the distillate); the number-average molecular weight $M_n$ is about 2400 g/mol. NMR-spectroscopic analyses show the expected signals of the silicone poly(meth)acrylate.

EXAMPLE 2

Preparing a silicone poly(meth)acrylate according to the invention 158.0 g of Synthalat A 191 (from Synthopol Chemie, Buxtehude) (63.3% strength in Shellsol A:butyl acetate 1.35:1), 62.9 g of Solvesso 150 and 22.3 g of siloxane 1 (ethoxy content 6.3%) are placed in a reaction vessel with stirrer, thermometer and distillation device, the mixture is heated to 65° C., and 0.72 g of aluminum acetylacetonate is added. The mixture is heated slowly to 155 to 160° C. and the distillate which forms is removed continuously. After about 1 h, 45 g of Solvesso 150 are added and the conditions are held for a further 2 h. Under these conditions the reaction mixture is clear and homogeneous at room temperature (tested by applying a quantity of sample to a glass plate). The mixture is cooled, and 10% of methoxybutyl acetate is added. The resulting product is clear, yellowish and has a solids content of 34%. At least 50% of the ethoxy groups have reacted (conversion check by way of gas-chromatographic analysis of the distillate); the number-average molecular weight $M_n$ is about 5000 g/mol. NMR-spectroscopic analyses show the expected signals of the silicone poly(meth)acrylate.

EXAMPLE 3

Preparing a silicone poly(meth)acrylate according to the invention 192.9 g of Joncryl 500 (80% solid content in 2-heptanone, from Speciality Chemicals, Mijdrecht), 88.4 g of methoxypropyl acetate and 38.7 g of siloxane 4 (ethoxy content 6.4%) are placed in a reaction vessel with stirrer, thermometer and distillation device, the mixture is heated to 120° C., and 2.8 ml of a 33% solid content solution of butyl titanate in butyl acetate are added. The mixture is heated slowly to 150° C., the distillate which forms is removed continuously, and the conditions are held for about 1 h. The mixture is cooled and filtered through a T 750 filter (from Seitz). The resulting product is almost clear and yellowish. At least 70% of the ethoxy groups have reacted (conversion check by gas-chromatographic analysis of the distillate); the number-average molecular weight $M_n$ is about 2500 g/mol. NMR-spectroscopic analyses show the expected signals of the silicone poly(meth)acrylate.

Preparing coating materials

Coating Example Ia 50 p of Macrynal VSM 1565 (70%)
1 p of methoxypropyl acetate
1.5 p of Solvesso 100
5 p of butyl acetate
0.6 p of dibutyltin dilaurate (1% in xylene)
2 p of compound according to the invention from Example 1 or 2
4 p of butyl acetate
1 p of customary commercial isocyanate hardener
are mixed homogeneously with one another in succession. The mixture is then applied with a dry film thickness of from 30 to 100 $\mu$m to a customary commercial primer. The coating is cured at room temperature for 7 days. Alternatively, curing can be carried out at 60° C. for 16 hours.

Comparison Experiment A

The procedure of Example Ia is repeated, the compound according to the invention from Preparation Example 1 being replaced by the α,ω-hydroxy-functional polydimethylsiloxane Tegopren H—Si 2111 (Th. Goldschmidt AG).

Comparison Experiment B

The procedure of Example Ia is repeated, the compound according to the invention from Preparation Example 1 being replaced by silicone caprolactone Byk 370 (BYK).

The following analyses are carried out:

Abhesion

After the coating material is cured, the Bonder metal panel is sprayed with customary commercial spray-can paints. After this coat of paint has dried, this area is covered with adhesive tape. By tearing off the tape the spray-can coat is removed.

1=very good spray-can paint adhesion
2=good spray-can paint adhesion
3=no spray-can paint adhesion Felt-tip pen resistance After the paint is cured, the object is written on with customary commercial felt-tip pen. After drying, the felt-tip is removed by rubbing with a dry paper handkerchief.

1=felt-tip impossible to remove
2=felt-tip difficult to remove
3=felt-tip easy to remove Chemical resistance The chemical tests were carried out with the solvent xylene, ethyl glycol and methoxypropyl acetate in accordance with DIN 53 168.

After 100 WOM:

The abhesion test and the felt-tip pen resistance are tested after 100 h of Weatherometer (WOM) sunshine testing.

Clouding of the clearcoat film:

The coating film is applied to a transparent sheet and the clouding is assessed visually after the clearcoat film has dried.

After drying for 2 days at room temperature:

| Coating example | Felt-tip resistance 48 h Rt | after 100 h WOM | Abhesion 48 h RT | after 100 h WOM | Transparency in the clearcoat film |
|---|---|---|---|---|---|
| Ia (Example 1) | 3 | 3 | 3 | 3 | transparent |
| Ia (Example 2) | 3 | 3 | 3 | 3 | transparent |
| Comparison Ex. A | 1 | 1 | 1 | 1 | clouding |
| Comparison Ex. B | 1 | 1 | 1 | 1 | transparent |

The chemical resistance is very good for all the coating examples.

After drying for 7 days at room temperature:

| Coating example | Felt-tip resistance 48 h Rt | after 100 h WOM | Abhesion 48 h RT | after 100 h WOM | Transparency in the clearcoat film |
|---|---|---|---|---|---|
| Ia (Example 1) | 3+ | 3+ | 3+ | 3+ | transparent |
| Ia (Example 2) | 3 | 3 | 3 | 3 | transparent |
| Comparison Ex. A | 2 | 2 | 2 | 2 | clouding |
| Comparison Ex. B | 1 | 1 | 1 | 1 | transparent |

The chemical resistance is very good for all the coating examples.

Coating Example Ib 50 p of Macrynal VSM 1565 (70%)
1 p of methoxypropyl acetate
1.5 p of Solvesso 100
5 p of butyl acetate
0.6 p of dibutyltin dilaurate (1% in xylene)
36 p of Kronos RW 59
2 p of compound from Example 2
4 p of butyl acetate
1 p of customary commercial isocyanate hardener are processed as for Coating Example Ia.

Coating Example Ic 50 p of Bayhydrol VPLS 2139
1 p of Surfinol 104 E (50%)
5.5 p of Acrysol RM8 (18% in ethanol)
24 p of Bayertitan RKB-4
2 p of compound from Example 2
pH 7.5 with DMEA
35 p of fully deionized water are mixed homogeneously with one another using a bead mill and the mixture is adjusted with fully deionized water to a flow time of 85" DIN 4 cup. It is then applied with a dry film thickness of from 30 to 100 μm to a customary commercial primer. The coating material is cured at room temperature for 7 days. Alternatively, curing can be carried out at 60° C. for 16 hours.

The coatings of Coating Example Ib and Ic give an outstanding antigraffiti effect against spray paints and felt-tip pens. The effect is retained even after weathering or after chemical treatment with, for example, customary commercial graffiti removers.

The abovementioned examples readily demonstrate the superiority of the compounds according to the invention in terms of obtaining a permanent antigraffiti effect.

We claim:

1. A silicone poly(meth)acrylate of the general formula

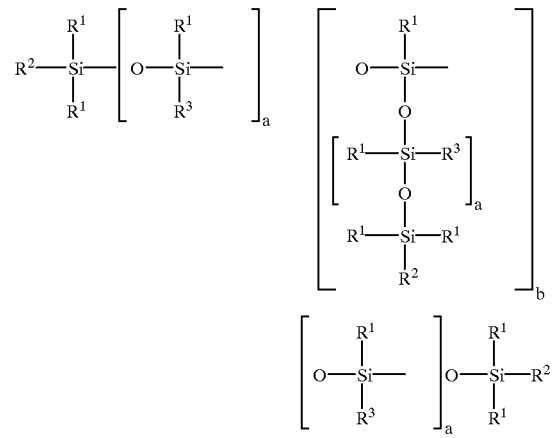

in which the groups $R^1$ are identical or different aliphatic or aromatic hydrocarbon radicals, at least 90% of the groups $R^1$ being methyl groups, $R^2$ are identical or different alkoxy groups or are identical or different poly(meth)acrylate at least 20% of the groups $R^2$ being hydroxy-functional poly(meth)acrylate groups, $R^3$ is $R^1$ or $R^2$, a is 1 to 100 and b is 0 to 20 for use in dirt-repelling compositions.

2. The silicone poly(meth)acrylate as claimed in claim 1, wherein $R^1$ is methyl.

3. The silicone poly(meth)acrylate as claimed in claim 1 or 2, wherein a is 5 to 30.

4. The silicone poly(meth)acrylate as claimed in claim 1 or 2, wherein b is 0 to 3.

5. The silicone poly(meth)acrylate as claimed in claim 1 wherein R are identical or different alkoxy groups or identical or different poly(meth)acrylate groups at least 20% of the groups R being poly(meth)acrylate groups and these hydroxy-functional poly(meth)acrylates featuring, moreover, a weight-average molecular weight of from 2000 to 30,000 g/mol and an OH content of from 1 to 10%.

6. The silicone poly(meth)acrylate as claimed in claims 1 wherein b is 0.

7. A coating composition for producing dirt-repelling coatings, comprising one or more compounds as claimed in claim 1.

8. The coating composition as claimed in claim 7, which comprises one or more customary paint solvents.

9. The coating composition as claimed in claim 7, which is an aqueous coating composition which can comprise one or more organic solvents.

10. The coating composition as claimed in claim 7, wherein the liquid phase is in the form of monomers or low molecular mass compounds.

11. The coating composition as claimed in claim 7, which is a powder coating.

12. The silicone poly(meth)acrylate as claimed in claim 3, wherein b is 0 to 3.

13. The silicone poly(meth)acrylate as claimed in claim 5 wherein b is 0.

14. A coating composition for producing dirt-repelling coatings, comprising one or more compounds as claimed in claim 5.

15. A coating composition for producing dirt-repelling coatings, comprising one or more compounds as claimed in claim 6.

16. The coating composition as claimed in claim 14 or 15, which comprises one or more customary paint solvents.

17. The coating composition as claimed in claim 14 or 15, which is an aqueous coating composition which can comprise one or more organic solvents.

18. The coating composition as claimed in claim 14 or 15, wherein the liquid phase is in the form of monomers or low molecular mass compounds.

19. The coating composition as claimed in claim 14 or 15, which is a powder coating.

* * * * *